(12) United States Patent
Yamaguchi

(10) Patent No.: US 11,015,056 B2
(45) Date of Patent: May 25, 2021

(54) POLYARYLENE SULFIDE RESIN COMPOSITION, MOLDED ARTICLE, AND PRODUCTION METHODS

(71) Applicant: DIC Corporation, Tokyo (JP)

(72) Inventor: Youhei Yamaguchi, Ichihara (JP)

(73) Assignee: DIC Corporation, Tokyo (JP)

( * ) Notice: Subject to any disclaimer, the term of this patent is extended or adjusted under 35 U.S.C. 154(b) by 25 days.

(21) Appl. No.: 16/318,521

(22) PCT Filed: Jul. 13, 2017

(86) PCT No.: PCT/JP2017/025516
§ 371 (c)(1),
(2) Date: Jan. 17, 2019

(87) PCT Pub. No.: WO2018/016411
PCT Pub. Date: Jan. 25, 2018

(65) Prior Publication Data
US 2019/0233644 A1 Aug. 1, 2019

(30) Foreign Application Priority Data

Jul. 19, 2016 (JP) .................................. 2016-141355
Sep. 21, 2016 (JP) ............................. JP2016-184191

(51) Int. Cl.
| | | |
|---|---|---|
| *B32B 27/28* | (2006.01) | |
| *C08L 81/02* | (2006.01) | |
| *C08K 5/098* | (2006.01) | |
| *C08L 23/26* | (2006.01) | |
| *C08J 5/12* | (2006.01) | |
| *B32B 27/38* | (2006.01) | |
| *C08K 3/26* | (2006.01) | |
| *C08K 7/14* | (2006.01) | |

(52) U.S. Cl.
CPC ............ *C08L 81/02* (2013.01); *B32B 27/286* (2013.01); *B32B 27/38* (2013.01); *C08J 5/12* (2013.01); *C08J 5/124* (2013.01); *C08K 5/098* (2013.01); *C08L 23/26* (2013.01); *C08K 7/14* (2013.01); *C08K 2003/265* (2013.01)

(58) Field of Classification Search
None
See application file for complete search history.

(56) References Cited

U.S. PATENT DOCUMENTS

| 2002/0161089 A1 | 10/2002 | Nagatoshi et al. |
| 2002/0188096 A1 | 12/2002 | Tsubokura et al. |
| 2008/0085963 A1 | 4/2008 | Akiyama et al. |
| 2015/0080507 A1 | 3/2015 | Koyanagi |

FOREIGN PATENT DOCUMENTS

| CN | 102898834 A | 1/2013 |
| EP | 1234856 A1 | 8/2002 |
| EP | 2829578 A1 | 1/2015 |
| EP | 0147692 A1 | 12/2019 |
| JP | 05-078575 A | 3/1993 |
| JP | 10-212408 A | 8/1998 |
| JP | 2001-354855 A | 12/2001 |
| JP | 2002-012762 A | 1/2002 |
| JP | 2004-035635 A | 2/2004 |
| JP | 2006-316245 A | 11/2006 |
| JP | 2014-114361 A | 6/2014 |
| JP | 2014114361 | * 6/2014 |
| WO | 2013/141364 A1 | 9/2013 |

OTHER PUBLICATIONS

Supplementary European Search Report dated Dec. 6, 2019, issued for the European patent application No. 17830930.8.
International Search Report dated Aug. 15, 2017, issued for PCT/JP2017/025516 and English translation thereof.
Written Opinion dated Aug. 15, 2017, issued for PCT/JP2017/025516.

\* cited by examiner

*Primary Examiner* — David J Buttner
(74) *Attorney, Agent, or Firm* — Locke Lord LLP; James E. Armstrong, IV; Nicholas J. Di Ceglie, Jr.

(57) ABSTRACT

Provided are a polyarylene sulfide resin composition containing a polyarylene sulfide resin (A), an olefin wax (B) having one or more substituents selected from the group consisting of a carboxy group, a carboxylic anhydride group, and a hydroxy group in the range of 0.01 to 5 parts by mass relative to 100 parts by mass of the polyarylene sulfide resin (A), and one or more fatty acid metal salts (C) selected from the group consisting of fatty acid alkali metal salts and fatty acid alkali earth metal salts in the range of 0.01 to 5 parts by mass relative to 100 parts by mass of the polyarylene sulfide resin (A) as essential components, a molded article, a composite molded article with an epoxy resin cured product, and methods for producing the polyarylene sulfide resin composition, the molded article, and the composite molded article.

10 Claims, No Drawings

POLYARYLENE SULFIDE RESIN COMPOSITION, MOLDED ARTICLE, AND PRODUCTION METHODS

FIELD OF INVENTION

The present invention relates to a polyarylene sulfide resin composition, a molded article, and methods for producing the polyarylene sulfide resin composition and the molded article

BACKGROUND ART

Polyarylene sulfide (hereinafter sometimes abbreviated as PAS) resins, such as polyphenylene sulfide (hereinafter sometimes abbreviated as PPS) resins, are excellent in heat resistance, and also excellent in mechanical strength, chemical resistance, molding processability, and size stability. Taking advantage of the characteristics, the resins are used as a material for electric and electronic device components, car components, and the like.

As a secondary processing of such a component, the component is often bonded to a component material containing an epoxy resin or the like. However, polyarylene sulfide resins are relatively inferior in adhesion to other resins, particularly to epoxy resins. Thus, in bonding polyarylene sulfides to each other or bonding a polyarylene sulfide resin and another material via, for example, an epoxy adhesive, or in encapsulating electric or electronic components using an epoxy resin, poor adhesion of the polyarylene sulfide resin to a curable resin composition containing an epoxy resin (hereinafter sometimes refers to as epoxy resin adhesion) has been a problem.

Thus, for improving the poor epoxy resin adhesion, a method is proposed in which an oxidized polyethylene wax is added as a releasing agent to a polyarylene sulfide resin composition containing a polyarylene sulfide resin and a filler to improve the balance among the epoxy resin adhesion, the releasing property, and the mechanical properties of the molded article (see PTL 1). However, also in this case, the epoxy resin adhesion of the polyarylene sulfide resin molded article is not good enough for practical use.

Furthermore, for the purpose of increasing the molding releasing properties, a resin composition in which an amorphous α-olefin copolymer and a fatty acid metal salt are mixed with a polyphenylene sulfide resin composition has been studied (see PTL 2). However, also in this case, a satisfactory epoxy resin adhesion has not been achieved.

It is known that a molded article that is produced by molding a polyarylene sulfide resin composition containing a polyarylene sulfide resin and an olefin wax that has an acid value ranging from 65 to 150 mgKOH/g and has a carboxy group and a carboxylic anhydride group maintains the mechanical characteristics inherent in polyarylene sulfide resin molded articles, and is also excellent in the epoxy resin adhesion (see PTL 3). However, also in this case, satisfactory adhesion to epoxy resins has not been achieved and there has been a room for improvement. In addition, the molded article has a room for improvement in the toughness, particularly in the bending elongation strength in the TD direction (the direction perpendicular to the machine direction of the resin), and particularly in reduction of the thickness of the molded article, brittle fracture tends to occur in the molded article. Thus, improvement of the bending elongation strength, particularly in the TD direction, has been also desired.

CITATION LIST

Patent Literatures

PTL 1: JP-A-2002-012762
PTL 2: JP-A-2004-35635
PTL 3: WO-2013/141364

SUMMARY OF INVENTION

Technical Problems

A first problem that the present invention is intended to solve is to provide a polyarylene sulfide resin composition capable of providing a molded article excellent in epoxy resin adhesion and a molded article excellent in epoxy resin adhesion produced by molding the polyarylene sulfide resin composition, and to provide a composite molded article produced by bonding the molded article to a cured product of a curable resin composition containing an epoxy resin, and to provide methods for producing the polyarylene sulfide resin composition, the molded article, and the composite molded article.

A second problem that the present invention is intended to solve is to provide a polyarylene sulfide resin composition capable of providing a molded article that is excellent not only in epoxy resin adhesion and but also in bending elongation strength in the TD direction, and a molded article that is excellent in epoxy resin adhesion and in bending elongation strength in the TD direction produced by molding the polyarylene sulfide resin, and to provide a composite molded article produced by bonding the molded article to a cured product of a curable resin composition containing an epoxy resin, and to provide methods for producing the polyarylene sulfide resin composition, the molded article, and the composite molded article.

Solution to Problems

As a result of intensive and extensive studies for solving the above problems, the present inventor has found that a mixture of a polyarylene sulfide resin with an olefin wax having one or more substituents selected from the group consisting of a carboxy group, a carboxylic anhydride group, and a hydroxy group, and one or more fatty acid metal salts selected from the group consisting of fatty acid alkali metal salts and fatty acid alkali earth metal salts can have excellent adhesion to epoxy resin and have increased bending elongation strength in the TD direction, thus completing the present invention.

Specifically, the present invention is directed to a polyarylene sulfide resin composition including a polyarylene sulfide resin (A), an olefin wax (B) having at least one substituent selected from the group consisting of a carboxy group, a carboxylic anhydride group, and a hydroxy group, and at least one fatty acid metal salt (C) selected from the group consisting of a fatty acid alkali metal salt and a fatty acid alkali earth metal salt as essential components, in which the content of the olefin wax (B) is in the range of 0.01 to 5 parts by mass and the content of the fatty acid metal salts (C) is in the range of 0.01 to 5 parts by mass, relative to 100 parts by mass of the polyarylene sulfide resin (A).

The present invention is also directed to a molded article including a product produced by molding the polyarylene sulfide resin composition.

The present invention is also directed to a composite molded article including a product produced by bonding a molded article produced by molding the polyarylene sulfide resin composition to a cured product of a curable resin composition containing an epoxy resin.

The present invention is also directed to a method for producing a polyarylene sulfide resin composition, the method including melt-kneading a polyarylene sulfide resin (A), an olefin wax (B) having at least one substituent selected from the group consisting of a carboxy group, a carboxylic anhydride group, and a hydroxy group, and at least one fatty acid metal salt (C) selected from the group consisting of a fatty acid alkali metal salt and a fatty acid alkali earth metal salt as essential components at a temperature equal to or higher than the melting point of the polyarylene sulfide resin (A).

Advantageous Effects of Invention

The present invention can provide a polyarylene sulfide resin composition capable of providing a molded article excellent in epoxy resin adhesion, a molded article excellent in epoxy resin adhesion produced by molding the polyarylene sulfide resin composition, a composite molded article produced by bonding the molded article to a cured product of a curable resin composition containing an epoxy resin, and provide methods for producing the polyarylene sulfide resin composition, the molded article, and the composite molded article.

The present invention can also provide a polyarylene sulfide resin composition capable of providing a molded article that is excellent not only in epoxy resin adhesion and but also in bending elongation strength in the TD direction, and a molded article that is excellent in the epoxy resin adhesion and in the bending elongation strength in the TD direction produced by molding the polyarylene sulfide resin, and a composite molded article produced by bonding the molded article to a cured product of a curable resin composition containing an epoxy resin, and to provide methods for producing the polyarylene sulfide resin composition, the molded article, and the composite molded article.

DESCRIPTION OF EMBODIMENTS

The polyarylene sulfide resin composition of the present invention is characterized in that the polyarylene sulfide resin composition contains a polyarylene sulfide resin (A), an olefin wax (B) having one or more substituents selected from the group consisting of a carboxy group, a carboxylic anhydride group, and a hydroxy group, and one or more fatty acid metal salts (C) selected from the group consisting of fatty acid alkali metal salts and fatty acid alkali earth metal salts as essential components, and the content of the olefin wax (B) is in the range of 0.01 to 5 parts by mass, and the content of the fatty acid metal salts (C) is in the range of 0.01 to 5 parts by mass, relative to 100 parts by mass of the polyarylene sulfide resin (A).

The polyarylene sulfide resin composition of the present invention contains a polyarylene sulfide resin (A) as an essential component. The polyarylene sulfide resin for use in the present invention has a resin structure having as a repeating unit a structure in which an aromatic ring binds to a sulfur atom, and specifically is a resin having as repeating units a structural moiety represented by the following general formula (1):

[Chem. 1]

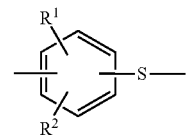

Formula (1)

(wherein, $R^1$ and $R^2$ each independently represent a hydrogen atom, an alkyl group having 1 to 4 carbon atoms, a nitro group, an amino group, a phenyl group, a methoxy group, or an ethoxy group), and, as required, further having a trifunctional structural moiety represented by the following general formula (2):

[Chem. 2]

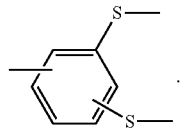

Formula (2)

The content of the trifunctional structural moiety represented by the formula (2) is preferably in the range of 0.001 to 3% by mole based on the total moles of itself and other structural moieties, and particularly preferably in the range of 0.01 to 1% by mole.

Here, in the structural moiety represented by the general formula (1), $R^1$ and $R^2$ in the formula are particularly preferably a hydrogen atom in terms of the mechanical strength of the polyarylene sulfide resin, and in this case, examples of such structural moieties include one having a binding at a para position represented by the formula (3) and one having a binding at a meta position represented by the formula (4):

[Chem. 3]

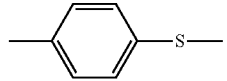

Formula (3)

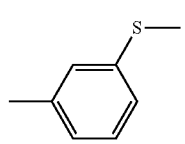

Formula (4)

Among them, a repeating unit of a structure represented by the general formula (3) in which a sulfur atom binds to an aromatic ring at a para position is preferred in terms of the heat resistance and crystallinity of the polyarylene sulfide resin.

The polyarylene sulfide resin may contain not only structural moieties represented by the general formula (1) and (2) but also structural moieties represented by the structural formulae (5) to (8):

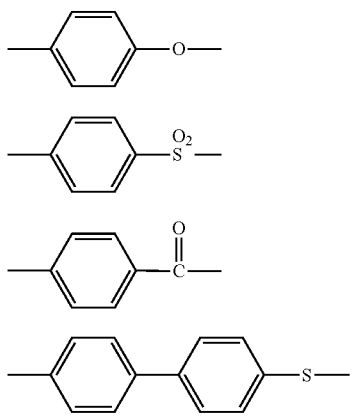

Formula (5)

Formula (6)

Formula (7)

Formula (8)

at 30% by mole or less of the total amount with the structural moieties represented by the general formula (1) and the general formula (2). In particular, in the present invention, the content of the structural moieties represented by the general formulae (5) to (8) is preferably 10% by mole or less in terms of the heat resistance and mechanical strength of the polyarylene sulfide resin. When the polyarylene sulfide resin contains structural moieties represented by the general formulae (5) to (8), the resin may be a random copolymer or a block copolymer regarding the binding type thereof.

The polyarylene sulfide resin may have a naphthyl sulfide bond or the like in the molecular structure, but the content is preferably 3% by mole or less based on the total moles with the other structural moieties, and particularly preferably 1% by mole or less.

The physical properties of the polyarylene sulfide resin are not limited unless the effects of the present invention are impaired, and are as follows.

(Melting Viscosity)

The polyarylene sulfide resin for use in the present invention preferably has a melting viscosity (V6) at 300° C. in the range of 2 to 1000 [Pa·s], more preferably in the range of 10 to 500 [Pa·s] because of good balance between flowability and mechanical strength, and particularly preferably 60 to 200 [Pa·s]. Note that, in the present invention, the melting viscosity (V6) is a value measured with a flow tester, CFT-500D, manufactured by Shimadzu Corporation after keeping a polyarylene sulfide resin at 300° C. under a load of $1.96 \times 10^6$ Pa and L/D=10/1 for 6 minutes.

(Non-Newtonian Index)

The Non-Newtonian index of the polyarylene sulfide resin (A) for use in the present invention is not limited unless the effects of the present invention are impaired, but is preferably in the range of 0.90 to 2.00. When a linear polyarylene sulfide resin is used, the Non-Newtonian index is preferably in the range of 0.90 to 1.50, and further preferably in the range of 0.95 to 1.20. Such a polyarylene sulfide resin is excellent in mechanical properties, flowability, and wear resistance. Note that the Non-Newtonian index (N value) is a value calculated using the following formula based on a shear rate and a shear stress measured with a capilograph under conditions of 300° C. and a ratio of orifice length (L) to orifice diameter (D), L/D, of 40.

$$SR = K \cdot SS^N \quad \text{[Math. 1]}$$

wherein SR represents a shear rate (sec$^{-1}$), SS represents a shear stress (dyne/cm$^2$), and K represents a constant. The closer to 1 the N value is, the more linear the structure of PPS is, and the larger the N value is, the more branched the structure of PPS is.

(Production Method)

The method for producing the polyarylene sulfide resin (A) is not limited, but examples thereof include 1) a method in which a dihalogeno aromatic compound is polymerized in the presence of sulfur and sodium carbonate, with a polyhalogeno aromatic compound or another copolymerizable component added as required, 2) a method in which a dihalogeno aromatic compound is polymerized in the presence of a sulfidation agent or the like in a polar solvent, with a polyhalogeno aromatic compound or another copolymerizable component added as required, and 3) a method in which p-chlorothiophenol is subjected to self-condensation, with another copolymerizable component added as required. Among the above methods, the method 2) is versatile and thus preferred. In the reaction, an alkali metal salt of a carboxylic acid or a sulfonic acid or an alkali hydroxide may be added for controlling the polymerization degree. Among the methods according to 2), particularly preferred is a method in which an aqueous sulfidation agent is introduced into a heated mixture containing an organic polar solvent and a dihalogeno aromatic compound at such a rate that water can be removed from the reaction mixture, to allow the dihalogeno aromatic compound to react with the sulfidation agent in the organic polar solvent, with a polyhalogeno aromatic compound added as required, while controlling the water content in the reaction system within the range of 0.02 to 0.5 mol per mole of the organic polar solvent, thereby producing a polyarylene sulfide resin (JP-A-07-228699) or a method in which in the presence of a solid alkali metal sulfide and an aprotic polar organic solvent, a dihalogeno aromatic compound is reacted with an alkali metal hydrosulfide and an organic acid alkali metal salt with a polyhalogeno aromatic compound or another copolymerizable component added as required, while controlling the amount of the organic acid alkali metal salt within the range of 0.01 to 0.9 mol per mole of the sulfur source and controlling the water content in the reaction system to 0.02 mol or less per mole of the aprotic polar organic solvent (see WO2010/058713). Specific examples of dihalogeno aromatic compounds include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenylsulfone, 4,4'-dihalodiphenylsulfoxide, 4,4'-dihalodiphenylsulfide, and compounds having an alkyl group having 1 to 18 carbon atoms on an aromatic ring of the above compounds, and examples of polyhalogeno aromatic compounds include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. The halogen atoms contained in the above compounds are preferably chlorine atoms and/or bromine atoms.

The post-treatment method of the reaction mixture containing a polyarylene sulfide resin obtained through a polymerization step is not limited, and examples include (1) a method in which after completion of a polymerization reaction, the solvent is distilled under a reduced pressure or a normal pressure from the reaction mixture as it is or after addition of an acid or base, and then the resulting solid after distillation of the solvent is washed once or twice or more times with a solvent, such as water, the reaction solvent (or an organic solvent having a similar solubility of low molecular weight polymers), acetone, methyl ethyl ketone, and an alcohol, followed by neutralization, washing with water, filtration, and drying, or (2) a method in which after completion of a polymerization reaction, a solvent, such as water, acetone, methyl ethyl ketone, an alcohol, an ether, a halogenated hydrocarbon, an aromatic hydrocarbon, and an aliphatic hydrocarbon (a solvent that is soluble in the used polymerization solvent and that is a poor solvent at least to polyarylene sulfide) is added to the reaction mixture as a sedimentation agent to allow the solid product, such as the polyarylene sulfide and an inorganic salt, to settle down, and the sediment was filtered out, washed and dried, or (3) a method in which after completion of a polymerization reaction, the reaction solvent (or an organic solvent having a similar solubility of low molecular weight polymers) is added to the reaction mixture, the mixture is stirred, then is filtered to remove the low molecular weight polymers, and is washed once or twice or more times with a solvent, such as water, acetone, methyl ethyl ketone, or an alcohol, followed by neutralization, washing with water, filtration, and drying, (4) a method in which after completion of a polymerization reaction, water is added to the reaction mixture to wash the reaction mixture with water, with an acid added for an acid treatment as required, and the resultant is filtered and dried, and (5) a method in which after completion of a polymerization reaction, the reaction mixture is filtered, and is washed once or twice or more times with the reaction solvent as required, followed by further washing with water, filtration, and drying.

Note that in the post-treatment as mentioned in (1) to (5), the polyarylene sulfide resin may be dried in vacuum, in the air, or in an atmosphere of an inert gas, such as nitrogen.

The polyarylene sulfide resin composition of the present invention contains an olefin wax (B) having one or more substituents selected from the group consisting of a carboxy group, a carboxylic anhydride group, and a hydroxy group as an essential component. Note that the carboxylic anhydride group means a group represented by (—CO—O—CO—). The olefin wax (B) has at least one polar group selected from the group consisting of a carboxy group, a carboxylic anhydride group, and a hydroxy group, and a nonpolar group derived from a polyolefin, and thus is a wax having a polyolefin structure that acts as a releasing agent in such a manner that the polar groups orient toward a resin molded product whereas the nonpolar groups orient toward a mold in molding. Note that the wax in the present invention means a low molecular weight resin which is produced by polymerization, is typically in a solid form at 25° C., and has at least a releasing effect as an additive in a polyarylene sulfide resin composition. The wax in the present invention typically has a molecular weight (Mn) in the range of 250 to 10000, and preferably in the range of 300 to 7000. A molecular weight less than 250 leads to easy volatilization from vacuum vent, for example, in melt-kneading and such a wax tends to have less effect as a releasing agent. In molding, wax may bleed out more than need and may cause a stain on a mold. On the other hand, with a molecular weight exceeding 10,000, such a wax tends not to bleed out, and has a reduced effect as a releasing agent in some cases.

The molecular weight (Mw) is a value determined by GPC measurement with the following conditions.
Measurement apparatus: "HLC-8320 GPC" manufactured by Tosoh Corporation
Column: guard column "HXL-L" manufactured by Tosoh Corporation
  "TSK-GEL G1000HXL" manufactured by Tosoh Corporation
  "TSK-GEL G2000HXL" manufactured by Tosoh Corporation
  "TSK-GEL G3000HXL" manufactured by Tosoh Corporation
  "TSK-GEL G4000HXL" manufactured by Tosoh Corporation
Detector: RI (refractive index detector)
Data processor: "GPC-8020 model II version 4.10" manufactured by Tosoh Corporation
Column temperature: 40° C.
Eluent: tetrahydrofuran
Flow rate: 1.0 ml/min
Standard: the following monodisperse polystyrene having a known molecular weight was used according to the measurement manual of the "GPC-8020 model II version 4.10".
Monodisperse Polystyrene:
  "A-500" manufactured by Tosoh Corporation
  "A-2500" manufactured by Tosoh Corporation
  "F-1" manufactured by Tosoh Corporation
  "F-4" manufactured by Tosoh Corporation
  "F-20" manufactured by Tosoh Corporation
  "F-128" manufactured by Tosoh Corporation
  "F-380" manufactured by Tosoh Corporation
Measured sample: resin 1 mg (soluble in solvent) was dissolved in 1 ml of tetrahydrofuran, and then filtered with a microfilter (pore size: 0.45 μm) (50 μl).

As the olefin wax (B) having one or more substituents selected from the group consisting of a carboxy group, a carboxylic anhydride group, and a hydroxy group for use in the present invention, examples include a compound that is obtained by incorporating into an olefin wax (b) through a post treatment, one or more substituents selected from the group consisting of a carboxy group, a carboxylic anhydride group, and a hydroxy group, preferably by modifying an olefin wax (b) with maleic acid and/or maleic anhydride through a post treatment. As the olefin wax (b), a polyethylene wax and/or a 1-alkene polymer is preferably used, and an extremely good releasing effect is thus achieved. Polyethylene waxes produced by currently generally known methods may be used, and examples include one produced by polymerizing ethylene under a high temperature and a high pressure, one produced by subjecting polyethylene to pyrolysis, and one produced by purifying a polyethylene polymer by separating a low molecular weight component therefrom. Examples further include a copolymer obtained by copolymerizing in polymerization or copolymerization of ethylene and/or a 1-alkene a compound that contains a carboxy group and/or a carboxylic anhydride group which is copolymerizable with the monomer(s), preferably maleic anhydride, or maleic anhydride and maleic acid, and the thus-obtained copolymer is preferred since a carboxy group and a carboxylic anhydride group are stably contained at a high concentration. Examples of 1-alkenes include propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 1-nonadecene, 1-eicocene, 1-heneicocene, 1-dococene, 1-tricocene, 1-tetracocene, 1-pentacocene, 1-hexacocene, 1-heptacocene, 1-octacocene, and 1-nonacocene. An aliphatic hydrocarbon group constituting the olefin wax (B) for use in the present invention may be linear or branched, and may partially contain an unsaturated bond, an ester bond, or an ether bond. Specific examples of such olefin waxes (B) include Diacarna 3 (Mitsubishi Chemical Corporation), Licolub CE2 (Clariant Japan KK), Licolub H12 (product name, manufactured by Clariant Japan KK), and HW2203A (product name, manufactured by Mitsui Chemicals Inc.).

The acid value of the olefin wax (B) for use in the present invention is not limited as long as the effects of the present invention are exhibited. The lower limit of the acid value of the olefin wax (B) is preferably 15 mgKOH/g or more, more preferably 25 mgKOH/g or more, and particularly preferably 65 mgKOH/g or more. The upper limit of the acid value of the olefin wax (B) is preferably 150 mgKOH/g or less, more preferably 140 mgKOH/g or less, and particularly preferably 120 mgKOH/g. An acid value in the above range is preferred since the adhesion of a molded article obtained by molding the polyarylene sulfide resin composition of the present invention to an epoxy resin is particularly enhanced. The acid value can be measured by a method according to JIS K 0070. Specifically, the acid value is measured as the number of milligrams of potassium hydroxide required for neutralizing free fatty acids contained in 1 g of the wax.

The dropping point of the olefin wax (B) for use in the present invention is preferably in the range of 50° C. to 100° C., further preferably in the range of 60° C. to 90° C., and most preferably 70° C. to 80° C. The dropping point can be measured by a method according to ASTM D127. Specifically, the dropping point is measured, using a metal nipple, as a temperature at which the first drop of a melt wax falls from the metal nipple. Also in the following example, the dropping point can be measured in the same manner. With a dropping point in the above range, the olefin wax (B) provides a molded article having a good releasing property from a mold, and also has a suitable influence on the continual molding property. In addition, with a dropping point in the above range, the olefin wax (B) is likely to exude to a surface of a molded article. When the polyarylene sulfide resin composition is melt-kneaded, the olefin wax (B) is sufficiently molten. This allows the olefin wax (B) to substantially uniformly disperse in the molded article. Accordingly, segregation of the olefin wax (B) on a surface of a molded article is suppressed to thus reduce stains on the mold and deterioration in appearance of the molded article.

The content of the olefin wax (B) in the polyarylene sulfide resin composition is preferably in the range of 0.01 to 5 parts by mass relative to 100 parts by mass of the polyarylene sulfide resin (A), preferably in the range of 0.05 to 4.5 parts by mass, and further preferably in the range of 0.1 to 4 parts by mass. A content in the above range leads to superior releasing property of the molded article from a mold and also leads to superior epoxy resin adhesion. In addition, stains of a mold in molding and deterioration in appearance of the molded article can also be suppressed.

The polyarylene sulfide resin composition of the present invention contains one or more fatty acid metal salts (C) selected from the group consisting of fatty acid alkali metal salts and fatty acid alkali earth metal salts as an essential component.

The fatty acid metal salts (C) for use in the present invention are not limited as long as the effects of the present invention are exhibited, but a salt of a long chain fatty acid having a 12 or more carbon atoms is preferably used, and a salt of a long chain fatty acid having 20 to 30 carbon atoms is particularly preferably used. As such fatty acids, saturated fatty acids, unsaturated fatty acids, and derivatives thereof may be used, and a saturated fatty acid is particularly preferably used. As a fatty acid contained in the fatty acid metal salt (C) for use in the present invention, lauric acid, myristic acid, palmitic acid, stearic acid, oleic acid, linoleic acid, arachidic acid, behenic acid, lignoceric acid, cerotic acid, montanic acid, melissic acid, adipic acid, sebacic acid, and derivatives thereof are preferred, arachidic acid, behenic acid, lignoceric acid, cerotic acid, montanic acid, melissic acid, and derivatives thereof are more preferred, and behenic acid, montanic acid, and derivatives thereof are particularly preferred.

The salt contained in the fatty acid metal salt (C) for use in the present invention is one or more fatty acid metal salts selected from alkali metal salts and/or fatty acid alkali earth metal salts, and is not limited as long as the effects of the present invention are exhibited, but, for example, may be one or more selected from the group consisting of alkali metals, such as potassium, sodium, and lithium, and alkali earth metals, such as calcium, magnesium, and barium, and is particularly preferably fatty acid metal salts containing one or more salts selected from potassium, sodium, calcium, and lithium. The use of such fatty acid metal salts is preferred since ring opening of epoxy groups in the curable resin composition containing an epoxy resin is promoted on a surface of a molded article produced by molding the polyarylene sulfide resin composition.

The content of one or more fatty acid metal salts (C) selected from the group consisting of alkali metal salts and fatty acid alkali earth metal salts in the polyarylene sulfide resin composition is preferably in the range of 0.01 to 5 parts by mass relative to 100 parts by mass of the polyarylene sulfide resin (A), more preferably in the range of 0.05 to 4.5 parts by mass, and most preferably in the range of 0.1 to 4 parts by mass. With a content of the fatty acid metal salts (C) in the above range, the adhesion to epoxy resins can be enhanced and the releasing property from a mold in molding can be enhanced.

The polyarylene sulfide resin composition of the present invention may contain a filler as an optional component as required. As the filler, any known and commonly-used materials may be used unless the effects of the present invention are impaired, and examples of fillers include fillers having various shapes, such as fibrous fillers and non-fibrous fillers, for example, particulate and platelike fillers. Specifically, fibrous fillers, such as fibers, for example, glass fibers, carbon fibers, silane glass fibers, ceramic fibers, aramid fibers, metal fibers, potassium titanate, silicon carbide, calcium silicate, and wollastonite, and natural fibers may be used, and non-fibrous fillers, such as glass beads, glass flakes, barium sulfate, clay, pyrophyllite, bentonite, sericite, mica, mica, talc, attapulgite, ferrite, calcium silicate, calcium carbonate, magnesium carbonate, glass beads, zeolite, milled fibers, and calcium sulfate may also be used.

A filler is not an essential component in the present invention, and the content, if added, is not limited unless the effects of the present invention are impaired. The content of the filler is, for example, preferably in the range of 1 to 600 parts by mass relative to 100 parts by mass of the polyarylene sulfide resin (A), and more preferably in the range of 10 to 200 parts by mass. A content in this range is preferred since the resin composition exhibits good mechanical strength and moldability.

The polyarylene sulfide resin composition of the present invention may contain a silane coupling agent as an optional component as required. The silane coupling agent is not limited unless the effects of the present invention are impaired, and preferred examples include silane coupling agents having a functional group capable of reacting with a carboxy group, for example, an epoxy group, an isocyanato group, an amino group, or a hydroxy group. Examples of such silane coupling agents include epoxy group-containing alkoxysilane compounds, such as γ-glycidoxypropyltrimethoxysilane, γ-glycidoxypropyltriethoxysilane, and β-(3,4-epoxycyclohexyl)ethyltrimethoxysilane, isocyanate group-containing alkoxysilane compounds, such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane, and amino group-containing alkoxysilane compounds, such as γ-(2-aminoethyl)aminopropylmethyldimethoxysilane, γ-(2-aminoethyl)aminopropyltrimethoxysilane, and γ-aminopropyltrimethoxysilane, and hydroxy group-containing alkoxysilane compounds, such as γ-hydroxypropyltrimethoxysilane and γ-hydroxypropyltriethoxysilane. The silane coupling agent is not an essential component in the present invention, and the content of the silane coupling agent, if added, is not limited unless the effects of the present invention are impaired, and the content thereof is preferably in the range of 0.01 to 10 parts by mass relative to 100 parts by mass of the polyarylene sulfide resin (A), and further preferably in the range of 0.1 to 5 parts by mass. A content in this range is preferred since the resin composition has good corona resistance and moldability, in particular, good releasing property, and provides a molded article having superior adhesion to epoxy resins and having enhanced mechanical strength.

The polyarylene sulfide resin composition of the present invention may contain a thermoplastic elastomer as an optional component as required. Examples of thermoplastic elastomers include polyolefin elastomers, fluoroelastomers, and silicone elastomers, and preferred examples among them include polyolefin elastomers. When such an elastomer is added, the content thereof is not limited unless the effects of the present invention are impaired, and the content is preferably in the range of 0.01 to 10 parts by mass relative to 100 parts by mass of the polyarylene sulfide resin (A), and more preferably in the range of 0.1 to 5 parts by mass. A content in this range is preferred since the impact resistance of the resulting polyarylene sulfide resin composition is enhanced.

The polyolefin elastomer can be obtained, for example, by homopolymerization of an α-olefin or copolymerization of different α-olefins, and if a functional group is to be added, by copolymerization of an α-olefin and a vinyl polymerizable compound having the functional group. Examples of α-olefins include α-olefins having 2 to 8 carbon atoms, such as ethylene, propylene, and butene-1. Examples of functional groups include a carboxy group, an acid anhydride represented by —(CO)O(CO)—, esters thereof, an epoxy group, an amino group, a hydroxy group, a mercapto group, an isocyanate group, and an oxazoline group.

Specific examples of such vinyl polymerizable compounds having a functional group include α,β-unsaturated carboxylic acids and alkyl esters thereof, such as (meth)acrylic acid and (meth)acrylate esters, maleic acid, fumaric acid, itaconic acid, and other α,β-unsaturated dicarboxylic acids having 4 to 10 carbon atoms and derivatives thereof (mono- or diesters, acid anhydrides thereof, and the like), and glycidyl (meth)acrylate. Among them, ethylene-propylene copolymers and ethylene-butene copolymers having at least one functional group selected from the group consisting of an epoxy group, a carboxy group, and the acid anhydride group are preferred in terms of enhanced mechanical strength, in particular, toughness and impact resistance.

According to the use purpose, the polyarylene sulfide resin composition of the present invention may further appropriately contain, in addition to the aforementioned components, for example, a synthetic resin, such as a polyester resin, a polyamide resin, a polyimide resin, a polyetherimide resin, a polycarbonate resin, a polyphenylene ether resin, a polysulfone resin, a polyether sulfone resin, a polyetheretherketone resin, a polyetherketone resin, a polyarylene resin, a polyethylene resin, a polypropylene resin, a polytetrafluoroethylene resin, a polydifluoroethylene resin, a polystyrene resin, an ABS resin, a phenol resin, a urethane resin, or a liquid crystal polymer, as an optional component. The content of such a resin is different according to the use purpose and cannot be defined, but may be appropriately adjusted and used within 0.01 to 1000 parts by mass relative to 100 parts by mass of the polyarylene sulfide resin (A) according to the purpose and application so that the effects of the present invention are not impaired.

Besides, the polyarylene sulfide resin composition of the present invention may contain a known and commonly-used additive, such as a colorant, an antistatic agent, an antioxidant, a heat stabilizer, an ultraviolet stabilizer, an ultraviolet absorber, a foaming agent, a flame retardant, an auxiliary flame retardant, an antirust agent, or a coupling agent, as required, as an optional component. Such additives are not essential components, and, for example, may be appropriately adjusted and used preferably within 0.01 to 1000 parts by mass relative to 100 parts by mass of the polyarylene sulfide resin (A) according to the purpose and application so that the effects of the present invention is not impaired.

In the method for producing the polyarylene sulfide resin composition of the present invention, the polyarylene sulfide resin (A), the olefin wax (B) having one or more substituents selected from the group consisting of a carboxy group, a carboxylic anhydride group, and a hydroxy group, and one or more fatty acid metal salts (C) selected from the group consisting of fatty acid alkali metal salts and fatty acid alkali earth metal salts are melt-kneaded as essential components at a temperature equal to or higher than the melting point of the polyarylene sulfide resin (A).

In a preferred production method, the polyarylene sulfide resin composition of the present invention may be produced through a step in which the essential components of the polyarylene sulfide resin (A), the olefin wax (B), and the fatty acid metal salt(s) (C), and as required, optional components, such as a filler, are put in a powder, pellet, fine flake, or other forms so as to give the contents as described above, into a ribbon blender, a Henschel mixer, a V blender, or the like for dry blend, and then the blend is put into a known melt-kneader, such as a Bunbury mixer, a mixing roll, or a monoaxial or biaxial extruder and kneader, and is melt-kneaded at a resin temperature of the melting point of the polyarylene sulfide resin or higher, preferably of the melting point+10° C. or higher, more preferably within the melting point+10° C. to the melting point+100° C., and further preferably within the melting point+20° C. to the melting point+50° C. The addition of components into the mile-kneader and the mixing thereof may be performed at the same time, or may be performed separately.

The melt-kneader is preferably a biaxial kneading extruder from the viewpoints of dispersibility and productivity, and, for example, the components are preferably melt-kneaded while appropriately adjusting the discharge of the resin component within 5 to 500 (kg/hr) and the rotation speed of the screw within 50 to 500 (rpm), and the components are more preferably melt-kneaded under a condition of a ratio thereof (discharge/screw rotation speed) within 0.02 to 5 (kg/hr/rpm). Among the components, a filler and an additive, if added, are preferably put into the biaxial kneading extruder from a side feeder of the extruder from the viewpoint of dispersibility. The side feeder is located at such a position that the ratio of the distance from the resin injecting portion to the side feeder of the biaxial kneading extruder to the whole length of the screw of the extruder is in the range of 0.1 to 0.9. The ratio is particularly preferably in the range of 0.3 to 0.7.

The polyarylene sulfide resin composition of the present invention produced by melt-kneading in such a manner is a melt mixture containing the polyarylene sulfide resin (A), the olefin wax (B) having one or more substituents selected from the group consisting of a carboxy group, a carboxylic anhydride group, and a hydroxy group, and one or more fatty acid metal salts (C) selected from the group consisting of fatty acid alkali metal salts and fatty acid alkali earth metal salts which are essential components, and an optional component(s) added as required and components derived therefrom, and after the melt-kneading, the melt mixture is processed into a pellet, chip, granule, powder, or another form by a known method, followed by pre-drying at a temperature of 100 to 150° C. as required, and is subjected to various molding processes.

The polyarylene sulfide resin composition of the present invention produced by the production method as described above forms a morphology having a structure in which the olefin wax (B) and the aliphatic metal salt(s) (C) as essential components and components derived therefrom, and an optional component (s) added as required are dispersed in the polyarylene sulfide resin which acts as a matrix. As a result, not only the epoxy resin adhesion and the mechanical strength in the MD direction of a molded article, but also the mechanical strength in the TD direction, in particular, bending elongation strength in the TD direction thereof are increased, which is preferable.

The reason why the polyarylene sulfide resin molded article of the present invention has excellent adhesion to a curable resin composition containing an epoxy resin is considered as follows without wishing to be bound to a specific mechanism of actions. That is, on a surface of the molded article of the present invention, when one or more substituents selected from the group consisting of a carboxy group, a carboxylic anhydride group, and a hydroxy group of the olefin wax (B) is reacted with an epoxy group derived from the epoxy resin in the curable resin composition, a carboxylate anion (—COO—) derived from a functional group in the aliphatic metal salt (C) acts, as a basic catalyst (nucleophilic reagent), on a carbon atom of the epoxy group derived from the epoxy resin in the curable resin composition to promote ring opening of the epoxy group, and as a result, the reactivity of the epoxy group is increased, and furthermore, since the metal atom of the aliphatic metal salt (C) is an alkali metal atom or an alkali earth metal atom, which has lower energy of ionization and is more likely to ionize, as compared with another metal atom in the periodic table, for example, a zinc atom (Zn), the metal atom more easily produces carboxylate anions to promote ring opening of epoxy groups in the same manner as above, resulting in increase of the reactivity of the epoxy group. Supposedly, the epoxy resin adhesion is thus increased.

The polyarylene sulfide resin composition of the present invention may be subjected to various types of molding, such as injection molding, compression molding, extrusion into a composite, sheet, pipe, or the like, draw molding, blow molding, or transfer molding, but is particularly suitable for injection molding application because of the excellent releasing property. In molding by injection molding, the conditions of molding are not limited and molding may be performed by a common method. For example, after a step of melting the polyarylene sulfide resin composition in an injection molding machine at a resin temperature of the melting point of the polyarylene sulfide resin or higher, preferably of the melting point+10° C. or higher, more preferably within the melting point+10° C. to the melting point+100° C., and further preferably within the melting point+20° C. to the melting point+50° C., the resin composition is injected into a mold from a resin discharge port to mold the resin. At this time, the mold temperature may also be set to a known temperature range, for example, a room temperature (23° C.) to 300° C., and preferably 120 to 180° C.

The molded article produced by molding the polyarylene sulfide resin composition of the present invention has not only excellent adhesion to epoxy resins, but also improved bending elongation particularly in the TD direction of the resin in injection molding, and improved moldability.

The composition of the present invention is excellent in adhesion to curable resin compositions containing epoxy resins. The curable resin composition containing an epoxy resin, as used herein, is preferably a composition obtained by mixing an epoxy resin and a curing agent.

The epoxy resin for use in the present invention is not limited unless the effects of the present invention are impaired. Examples include bisphenol-type epoxy resins and novolac-type epoxy resins, and among then, preferred examples include bisphenol-type epoxy resins, which are superior in adhesion.

Examples of types of the bisphenol-type epoxy resins include glycidyl ethers of bisphenols, and specific examples include bisphenol A-type epoxy resins, bisphenol F-type epoxy resins, biphenyl-type epoxy resins, tetramethylbiphenyl-type epoxy resins, bisphenol S-type epoxy resins, bisphenol AD-type epoxy resins, and tetrabromobisphenol A-type epoxy resins.

Examples of types of the novolac-type epoxy resins include a novolac-type epoxy resin produced by a reaction of epihalohydrin with a novolac-type phenol resin produced through a condensation reaction of a phenol and an aldehyde, and specific examples include phenol novolac-type epoxy resins, cresol novolac-type epoxy resins, naphthol novolac-type epoxy resins, naphthol-phenol condensed novolac-type epoxy resins, naphthol-cresol condensed novolac-type epoxy resins, and brominated phenol novolac-type epoxy resins.

The epoxy resins are preferably used after a curing reaction with a curing agent.

The curing agent for curing an epoxy resin in the present invention is not limited as long as it is generally used as a curing agent of an epoxy resin, and examples include amine-type curing agents, phenol resin-type curing agents, acid anhydride-type curing agents, and latent curing agents.

As an amine-type curing agent, a known one may be used, and an aliphatic polyamine, an aromatic polyamine, or a heterocyclic polyamine, or an epoxy additive or a Mannich-modified product thereof, or a modified product of a polyamide may be used. Specific examples include diethylenetriamine, triethylenetetramine, tetarethylenepentamine, m-xylylenediamine, trimethylhexamethylenediamine, 2-methylpentamethylenediamine, isophoronediamine, 1,3-bisaminomethylcyclohexane, bis(4-aminocyclohexyl)methane, norbornenediamine, 1,2-diaminocyclohexane, diaminodiphenylmethane, m-phenylenediamine, diaminodiphenylsulfone, diethyltoluenediamine, trimethylenebis(4-aminobenzoate), and polytetramethyleneoxide-di-p-aminobenzoate. Among them, particularly preferred examples include m-xylylenediamine and 1,3-bisaminomethylcyclohexane since they are excellent in curability.

As a phenol resin-type curing agent, a known one may be used, and examples include bisphenols, such as bisphenol A, bisphenol F, and biphenol, trifunctional phenol compounds, such as tri(hydroxyphenyl)methane and 1,1,1-tri(hydroxyphenyl)ethane, phenol novolac, and cresol novolac.

As an acid anhydride-type curing agent, a known one may be used, and examples include phthalic anhydride, trimellitic anhydride, pyromellitic anhydride, maleic anhydride, tetrahydrophthalic anhydride, methyltetrahydrophthalic anhydride, nadic methyl anhydride, hexahydrophthalic anhydride, and methylhexahydrophthalic anhydride.

Examples of latent curing agents include dicyan diamide, imidazole, BF3-amine complexes, and guanidine derivatives.

The curing agents may be used alone or in combination of two or more thereof. A curing promotor may be appropriately used in combination to the extent that the effects of the present invention are not impaired. As the curing promotor, various compounds may be used, and examples include phosphorous compounds, tertiary amines, imidazole, organic acid metal salts, Lewis acids, and amine complex salts.

The curable resin composition containing an epoxy resin for use in the present invention may be subjected to a curing reaction with no solvent, or may be subjected to a curing reaction in the presence of a solvent, such as benzene, toluene, xylylene, ethyl acetate, acetone, methyl ethyl ketone, diethyl ether, tetrahydrofuran, methyl acetate, acetonitrile, chloroform, methylene chloride, carbon tetrachloride, 1,2-dichloroethane, 1,1,2-trichloroethane, tetrachloroethylene, N-methylpyrrolidone, isopropyl alcohol, isobutanol, and t-butyl alcohol.

In the curable resin composition for use in the present invention, the ratio of the epoxy resin to the curing agent used is not limited as long as it is such a known ratio that the effects of the present invention are not impaired. The ratio is preferably a ratio that gives active groups in the curing agent of 0.7 to 1.5 equivalents per equivalent of the total sum of the epoxy groups in the epoxy resin component since such a composition is excellent in curability and can provide a cured product excellent in heat resistance and chemical resistance.

A molded article produced by molding the polyarylene sulfide resin composition of the present invention, which is excellent in adhesion to epoxy resins, can be suitably used as a composite molded article in which the polyarylene sulfide resin is bonded to a cured product of a curable resin composition containing an epoxy resin.

The method for producing the composite molded article may be a known method unless the effects of the present invention are impaired, and examples include a method in which a molded article produced by molding the polyarylene sulfide resin composition is brought into contact with a curable resin composition containing an epoxy resin and the curable resin composition is cured.

Examples of applications of the composite molded article include electric or electronic components, such as housings of electric devices, for example, various household electric appliances, cell phones, and PC (personal computers), protection and support members for box-type electric or electronic component integral modules, multiple individual semiconductors or modules, sensors, LED lamps, connectors, sockets, resistors, relay cases, switches, coil bobbins, capacitors, variable condenser cases, optical pickups, oscillators, various terminal boards, transformers, plugs, printed circuit boards, tuners, speakers, microphones, headphones, compact motors, magnetic head bases, power modules, terminal blocks, semiconductors, liquid crystals, FDD carriages, FDD chassis, motor blush holders, parabola antennas, and computer-related components; household or office electrical product components, such as VTR components, TV components, iron, hair dryer, rice cooker, and microwave oven components, audio and video device components, for example, audio components, audio and laser discs, compact discs, DVD discs, and Blu-ray discs, illumination components, refrigerator components, air conditioner components, typewriter components, word processor components, and components for water section devices, for example, a water volume sensor and a temperature sensor for a water heater system or bath system; machine-related components, such as office computer-related components, telephone-related components, facsimile-related components, copier-related components, cleaning tools, motor components, writers, and type writers; components for optical machines and precision machines, such as microscopes, binoculars, cameras, and watches; and car and vehicle-related components, such as alternator terminals, alternator connectors, brush holders, slip rings, IC regulators, potentiometer bases for light dimmer, relay blocks, inhibitor switches, various valves, for example, exhaust gas valves, various pipes for fuel, exhaust systems, and induction systems, air intake nozzle snorkels, intake manifolds, fuel pumps, engine cooling joints, carburetor main bodies, carburetor spacers, exhaust gas sensors, cooling water sensors, oil temperature sensors, brake pad wear sensors, throttle position sensors, crank shaft position sensors, air flow meters, brake pad wear sensors, thermostat bases for air conditioners, heater warm air flow control valves, brush holders for radiator motors, water pump impellers, turbine vanes, wiper motor-related components, distributers, starter switches, ignition coils and their bobbins, motor insulators, motor rotors, motor cores, starter relays, transmission wire harnesses, window washer nozzles, air conditioner panel switch boards, fuel-related electromagnetic valve coils, fuse connectors, horn terminals, electrical component insulation boards, step motor rotors, lamp sockets, lamp reflectors, lamp housings, brake pistons, solenoid bobbins, engine oil filters, and ignition device cases. The composite molded article may also be applied to various other applications.

EXAMPLES

Examples 1 to 13 and Comparative Examples 1 to 7

In accordance with the components and the amount to be added (all in % by mass) shown in Tables 1 to 4, the materials were uniformly mixed with a tumbler. Then, the materials to be mixed were put into a vent-equipped twin screw extruder "TEM-35B" manufactured by Toshiba Machine Co. Ltd., and were melt-kneaded at a resin component discharge of 25 kg/hr, a screw rotation speed of 250 rpm, a ratio of the resin component discharge (kg/hr) to the screw rotation speed (rpm) (discharge/screw rotation speed) of 0.1 (kg/hr·rpm), and at a resin temperature set to 330° C. to produce pellets of a resin composition. The pellets were subjected to various evaluation test. The tests and the evaluation results are shown in Table 1 to 4.

[Adhesion Strength of PAS Resin Composition to Epoxy Resin]

The resulting pellets were supplied to an injection molding machine (SG75-HIPRO•MIII) manufactured by Sumitomo-Netstal at a cylinder temperature set to 320° C. to thus be subjected to injection molding using a mold for molding an ASTM Type-1 dumbbell specimen having a temperature adjusted to 130° C., thereby producing an ASTM Type-1 dumbbell specimen. The obtained ASTM Type-1 dumbbell specimen was divided into two pieces at the center, and a spacer (thickness: 1.8 to 2.2 mm, opening: 5 mm×10 mm) produced so as to give the contact area with a curable resin composition containing an epoxy resin of 50 mm$^2$ was inserted between the two-divided pieces of the ASTM Type-1 Dumbbell specimen. After fixing with clips, a curable resin composition containing an epoxy resin (a two-part epoxy resin manufactured by Nagase ChemiteX Corporation, main agent: XNR5002, curing agent: XNH5002, the ratio of main agent to curing agent=100:90) was injected into the opening and was heated in a hot air drier set at 135° C. for 3 hours to cure the resin and to bond the pieces. After cooling at 23° C. for 1 day, the spacer was removed, and the resulting test piece was subjected to measurement of the tensile strength at break with a tensile tester manufactured by Shimadzu Corporation at a rate of strain of 1 mm/min, a distance between the supporting points of 80 mm, and at 23° C. The tensile strength at break was divided by the adhesion area to determine the epoxy adhesion strength.

[Bending Elongation in TD Direction]

The resulting pellets were supplied to an injection molding machine (SG75-HIPRO•MIII) manufactured by Sumitomo-Netstal at a cylinder temperature set to 320° C. to thus be subjected to injection molding using a mold for molding an ISO D2 plate having a temperature adjusted to 130° C., followed by cutting into an ISO D2 plate to produce a test piece. The obtained test piece was subjected to measurement of the TD bending strength and the TD bending elongation by a measurement method according to ISO178.

TABLE 1

| | | Example 1 | Example 2 | Example 3 | Example 4 | Example 5 | Example 6 |
|---|---|---|---|---|---|---|---|
| PPS | A1 | 34.4 | 34.0 | | 33.5 | 34.3 | 59.0 |
| | A2 | | | 34.0 | | | |
| Wax | B1 | 0.1 | 0.5 | 0.5 | 1.0 | 0.5 | 0.5 |
| | B2 | | | | | | |
| | B3 | | | | | | |
| | B4 | | | | | | |
| | b5 | | | | | | |
| Fatty acid metal salt | C1 | 0.5 | 0.5 | 0.5 | 0.5 | 0.2 | 0.5 |
| | C2 | | | | | | |
| | C3 | | | | | | |
| | C4 | | | | | | |
| | c5 | | | | | | |
| Filler | D1 | 35 | 35 | 35 | 35 | 35 | 40 |
| | D2 | 30 | 30 | 30 | 30 | 30 | |
| | | | | Evaluation | | | |
| Adhesion strength (MPa) | | 3.1 | 3.4 | 2.5 | 3.8 | 3.3 | 2.9 |
| TD bending elongation (%) | | 0.82 | 0.84 | 0.7 | 0.83 | 0.75 | 1.6 |

TABLE 2

| | | Example 7 | Example 8 | Example 9 | Example 10 | Example 11 | Example 12 |
|---|---|---|---|---|---|---|---|
| PPS | A1 | 34.0 | 34.0 | 34.0 | 34.0 | 34.0 | 34.0 |
| | A2 | | | | | | |
| Wax | B1 | 0.5 | 0.5 | 0.5 | | | |
| | B2 | | | | 0.5 | | |
| | B3 | | | | | 0.5 | |
| | B4 | | | | | | 0.5 |
| | b5 | | | | | | |
| Fatty acid metal salt | C1 | | | | 0.5 | 0.5 | 0.5 |
| | C2 | 0.5 | | | | | |
| | C3 | | 0.5 | | | | |
| | C4 | | | 0.5 | | | |
| | c5 | | | | | | |
| Filler | D1 | 35 | 35 | 35 | 35 | 35 | 35 |
| | D2 | 30 | 30 | 30 | 30 | 30 | 30 |
| | | | | Evaluation | | | |
| Adhesion strength (MPa) | | 2.9 | 3.1 | 3.2 | 3.3 | 2.3 | 2.4 |
| TD bending elongation (%) | | 0.86 | 0.8 | 0.78 | 0.85 | 0.70 | 0.71 |

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| PPS | A1 | 35.0 | 34.5 | | 34.5 | 59.5 | 34.0 |
| | A2 | | | 34.5 | | | |
| Wax | B1 | | 0.5 | 0.5 | | 0.5 | |
| | B2 | | | | | | |
| | B3 | | | | | | |
| | B4 | | | | | | |
| | b5 | | | | | | 0.5 |
| Fatty acid metal salt | C1 | | | | 0.5 | | 0.5 |
| | C2 | | | | | | |
| | C3 | | | | | | |
| | C4 | | | | | | |
| | c5 | | | | | | |
| Filler | D1 | 35 | 35 | 35 | 35 | 40 | 35 |
| | D2 | 30 | 30 | 30 | 30 | | 30 |
| Evaluation | | | | | | | |
| Adhesion strength (MPa) | | 1.4 | 1.9 | 1.5 | 1.7 | 1.7 | 1.5 |
| TD bending elongation (%) | | 0.63 | 0.68 | 0.61 | 0.65 | 1.3 | 0.63 |

TABLE 4

| | | Comparative Example 7 |
|---|---|---|
| PPS | A1 | 34.0 |
| | A2 | |
| Wax | B1 | 0.5 |
| | B2 | |
| | B3 | |
| | B4 | |
| | B5 | |
| Fatty acid metal salt | C1 | |
| | C2 | |
| | C3 | |
| | C4 | |
| | c5 | 0.5 |
| Filler | D1 | 35 |
| | D2 | 30 |
| Evaluation | | |
| Adhesion strength (MPa) | | 2.0 |
| TD bending elongation (%) | | 0.65 |

In Tables 1 to 4, the proportions of the resins and materials mixed are expressed in parts by mass, and the followings were used.
A1: polyphenylene sulfide ("LR-2G" manufactured by DIC Corporation, melting viscosity (V6): 80 [Pa·s])
A2: polyphenylene sulfide ("T-2G" manufactured by DIC Corporation, melting viscosity (V6): 55 [Pa·s])
B1: olefin wax having a carboxy group and an acid anhydride group ("Licolub CE2" manufactured by Clariant Japan KK, acid value: 84 mgKOH/g, dropping point: 73° C.)
B2: α-olefin-maleic anhydride copolymer ("DIACARNA 30" manufactured by Mitsubishi Chemical Corporation, acid value: 105 mgKOH/g, dropping point: 76° C.)
B3: carboxy group-containing oxidized polyethylene wax ("Licolub H12" manufactured by Clariant Japan KK, acid value: 19 mgKOH/g, dropping point: 106° C.)
B4: maleic acid-modified polyethylene wax ("HW2203A" manufactured by Mitsui Chemicals Inc., acid value: 30 mgKOH/g)
b5: liner polyethylene wax ("Licowax PE 130" manufactured by Clariant Japan KK, acid value: 0 mgKOH/g)
C1: calcium montanate ("CaV-102" manufactured by Clariant Japan KK)
C2: sodium montanate ("NaV-101" manufactured by Clariant Japan KK)
C3: calcium behenate ("CS-7" manufactured by Nitto Kasei Kogyo KK)
C4: lithium 12-hydroxystearate ("LS-6" manufactured by Nitto Kasei Kogyo KK)
c5: zinc stearate (manufactured by Kawamura Kasei Industry Co. Ltd.)
D1: glass fiber (glass fiber chopped strand, fiber diameter: 10 μm, length: 3 mm)
D2: calcium carbonate (average particle size: 5 [μm])

The invention claime is:

1. A composite molded article comprising a product produced by bonding a molded article to a cured product of a curable resin composition containing an epoxy resin, wherein the molded article comprises a product produced by molding a polyarylene sulfide resin composition comprising a polyarylene sulfide resin (A), an olefin wax (B) having at least one substituent selected from the group consisting of a carboxy group, a carboxylic anhydride group, and a hydroxy group, and at least one fatty acid metal salt (C) selected from the group consisting of a fatty acid alkali metal salt and a fatty acid alkali earth metal salt as essential components, the content of the olefin wax (B) being in the range of 0.01 to 5 parts by mass, the content of the fatty acid metal salts (C) being in the range of 0.01 to 5 parts by mass, relative to 100 parts by mass of the polyarylene sulfide resin (A); and wherein the fatty acid metal salt (C) is a long chain fatty acid salt having 20 or more carbon atoms.

2. The composite molded article according to claim 1, wherein the polyarylene sulfide resin composition is a melt-kneaded product.

3. The composite molded article according to claim 1, wherein the polyarylene sulfide resin composition further includes 10 to 200 parts by mass of filler relative to 100 parts by mass of the polyarylene sulfide resin (A).

4. The composite molded article according to claim 1, wherein the content of the fatty acid metal salts (C) in the polyarylene sulfide resin composition is in the range of 0.1 to 5 parts by mass, relative to 100 parts by mass of the polyarylene sulfide resin (A).

5. The composite molded article according to claim 3, wherein the content of the fatty acid metal salts (C) in the polyarylene sulfide resin composition is in the range of 0.1 to 5 parts by mass, relative to 100 parts by mass of the polyarylene sulfide resin (A).

6. A method for producing a composite molded article, the method comprising bringing a molded article into contact with a curable resin composition containing an epoxy resin, and then curing the curable resin composition,
wherein the molded article comprises a product produced by molding a polyarylene sulfide resin composition comprising a polyarylene sulfide resin (A), an olefin wax (B) having at least one substituent selected from the group consisting of a carboxy group, a carboxylic anhydride group, and a hydroxy group, and at least one fatty acid metal salt (C) selected from the group consisting of a fatty acid alkali metal salt and a fatty acid alkali earth metal salt as essential components, the content of the olefin wax (B) being in the range of 0.01 to 5 parts by mass, the content of the fatty acid metal salts (C) being in the range of 0.01 to 5 parts by mass, relative to 100 parts by mass of the polyarylene sulfide resin (A); and wherein the fatty acid metal salt (C) is a long chain fatty acid salt having 20 or more carbon atoms.

7. The method for producing a composite molded article according to claim 6, wherein the polyarylene sulfide resin composition is a melt-kneaded product.

8. The method for producing a composite molded article according to claim 6, wherein the polyarylene sulfide resin composition further includes 10 to 200 parts by mass of filler relative to 100 parts by mass of the polyarylene sulfide resin (A).

9. The method for producing a composite molded article according to claim 6, wherein the content of the fatty acid metal salts (C) in the polyarylene sulfide resin composition is in the range of 0.1 to 5 parts by mass, relative to 100 parts by mass of the polyarylene sulfide resin (A).

10. The method for producing a composite molded article according to claim 8, wherein the content of the fatty acid metal salts (C) in the polyarylene sulfide resin composition is in the range of 0.1 to 5 parts by mass, relative to 100 parts by mass of the polyarylene sulfide resin (A).

* * * * *